(No Model.) 5 Sheets—Sheet 1.

J. C. WINTERS.
CAN CAPPING MACHINE.

No. 450,276. Patented Apr. 14, 1891.

(No Model.)

5 Sheets—Sheet 3.

J. C. WINTERS.
CAN CAPPING MACHINE.

No. 450,276. Patented Apr. 14, 1891.

Witnesses:
Jas. E. Hutchinson.
A. V. Cushman

Inventor:
John C. Winters,
by Henry Cabot
Atty.

(No Model.) 5 Sheets—Sheet 5.

J. C. WINTERS.
CAN CAPPING MACHINE.

No. 450,276. Patented Apr. 14, 1891.

Witnesses:
Jas. E. Hutchinson
H. V. Cushman

Inventor:
John C. Winters,
by Henry Calver,
Atty.

UNITED STATES PATENT OFFICE.

JOHN C. WINTERS, OF MOUNT MORRIS, NEW YORK.

CAN-CAPPING MACHINE.

SPECIFICATION forming part of Letters Patent No. 450,276, dated April 14, 1891.

Application filed March 24, 1890. Serial No. 345,121. (No model.)

*To all whom it may concern:*

Be it known that I, JOHN C. WINTERS, a citizen of the United States, residing at Mount Morris, in the county of Livingston and State of New York, have invented certain new and useful Improvements in Can-Capping Machines, of which the following is a specification, reference being had therein to the accompanying drawings.

My invention relates to a machine for soldering on the caps of filled tin cans containing fruit, vegetables, &c., and has for its object to provide a machine in which the cans will be automatically carried to and removed from the soldering-irons, which latter are rotary and automatic in their action; in which flux will be automatically applied to the caps to be soldered; in which the soldering-irons will be constantly heated when in use, and in which the solder will be automatically supplied to the irons and thus be applied to the cans, all as will be hereinafter more fully set forth.

Figure 1:
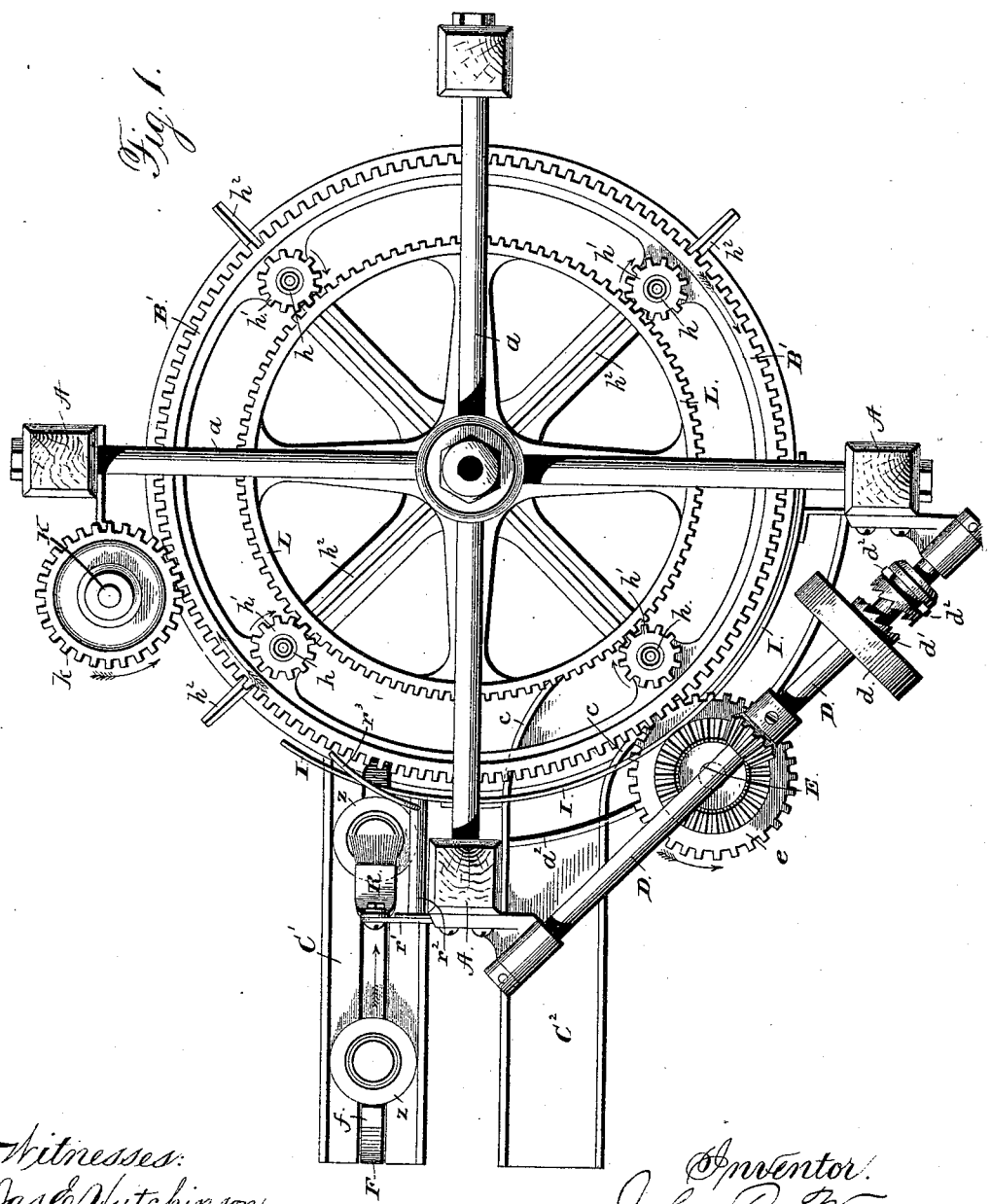
Figure 2:
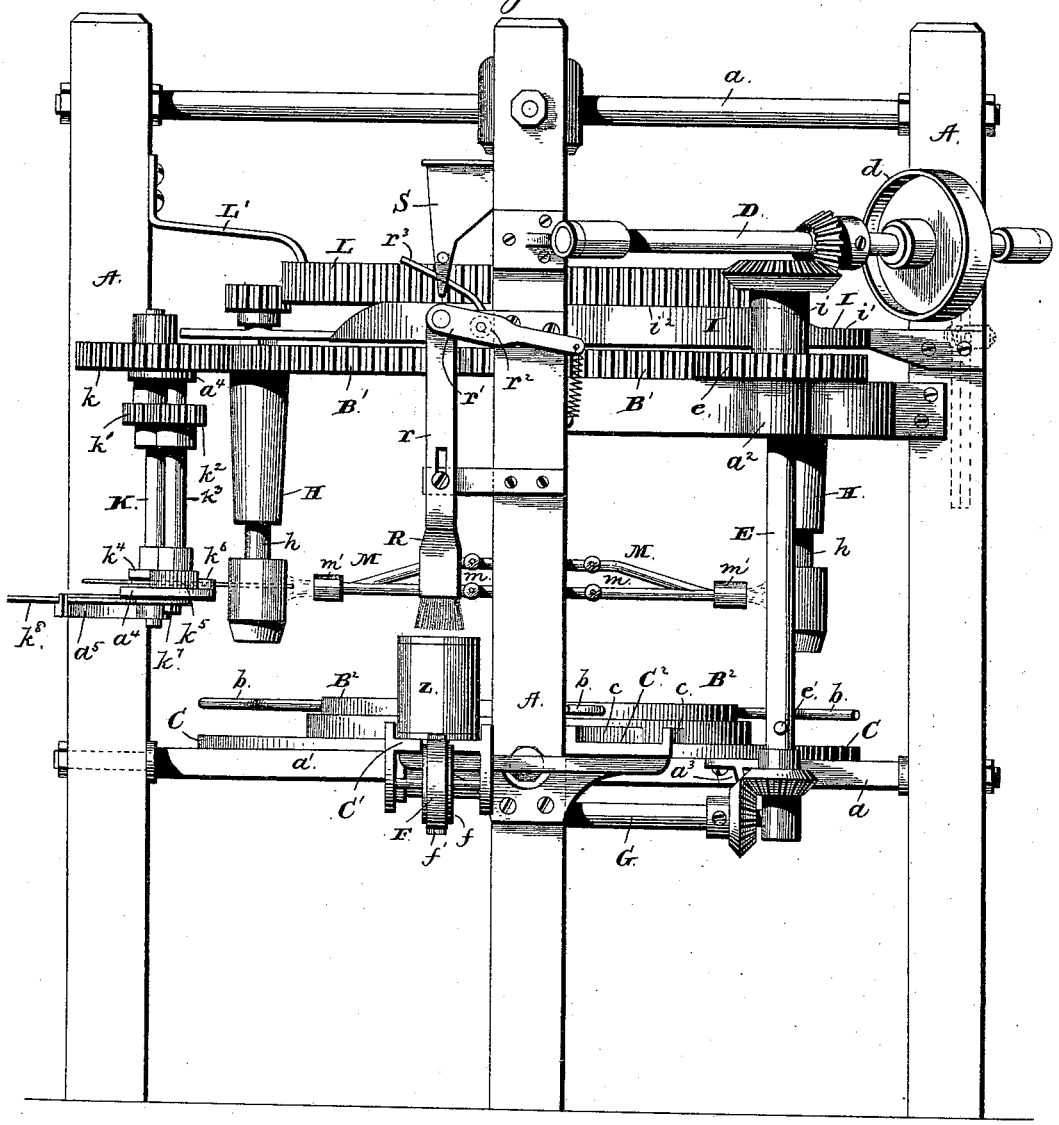
Figure 3:
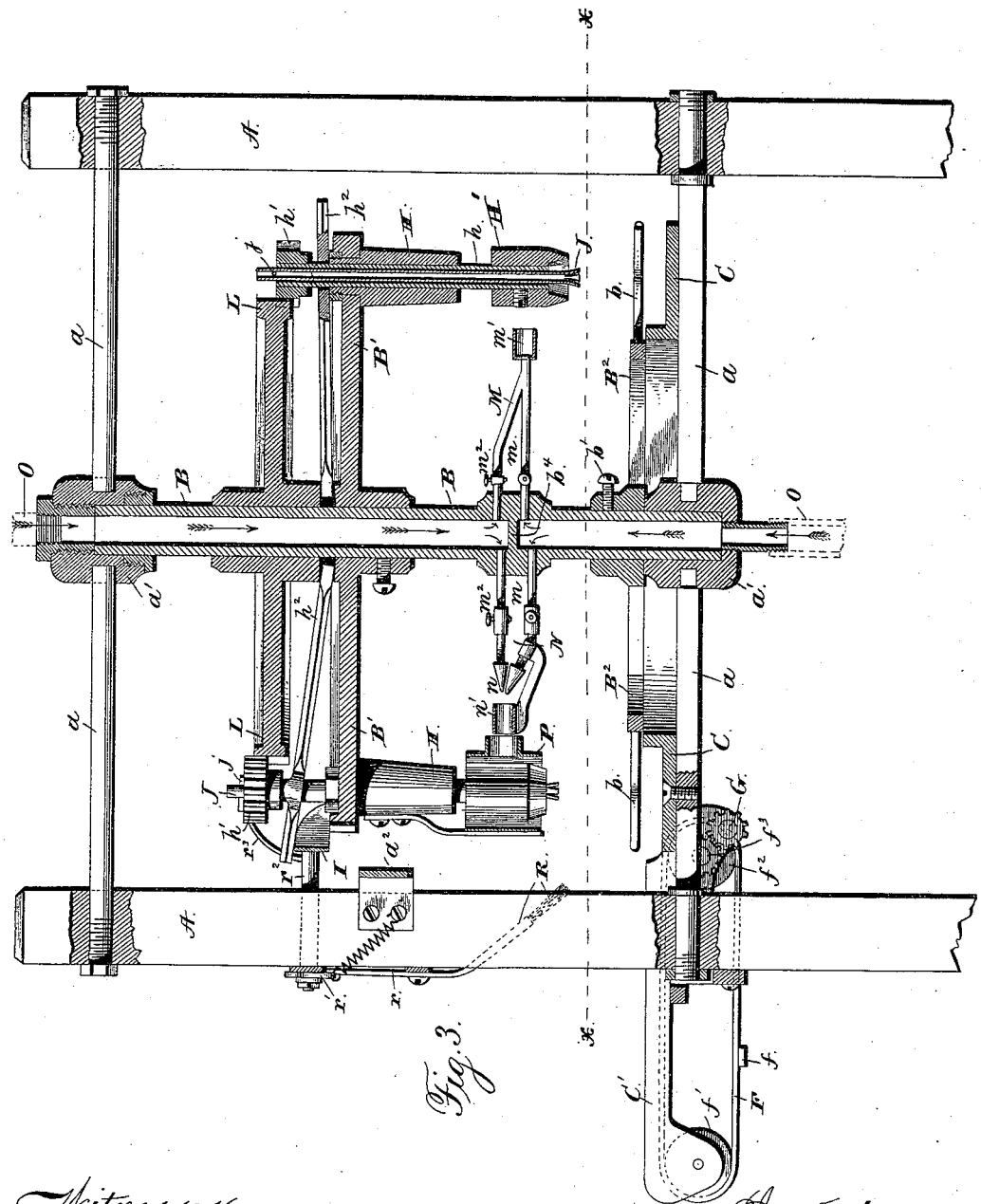
Figure 4:
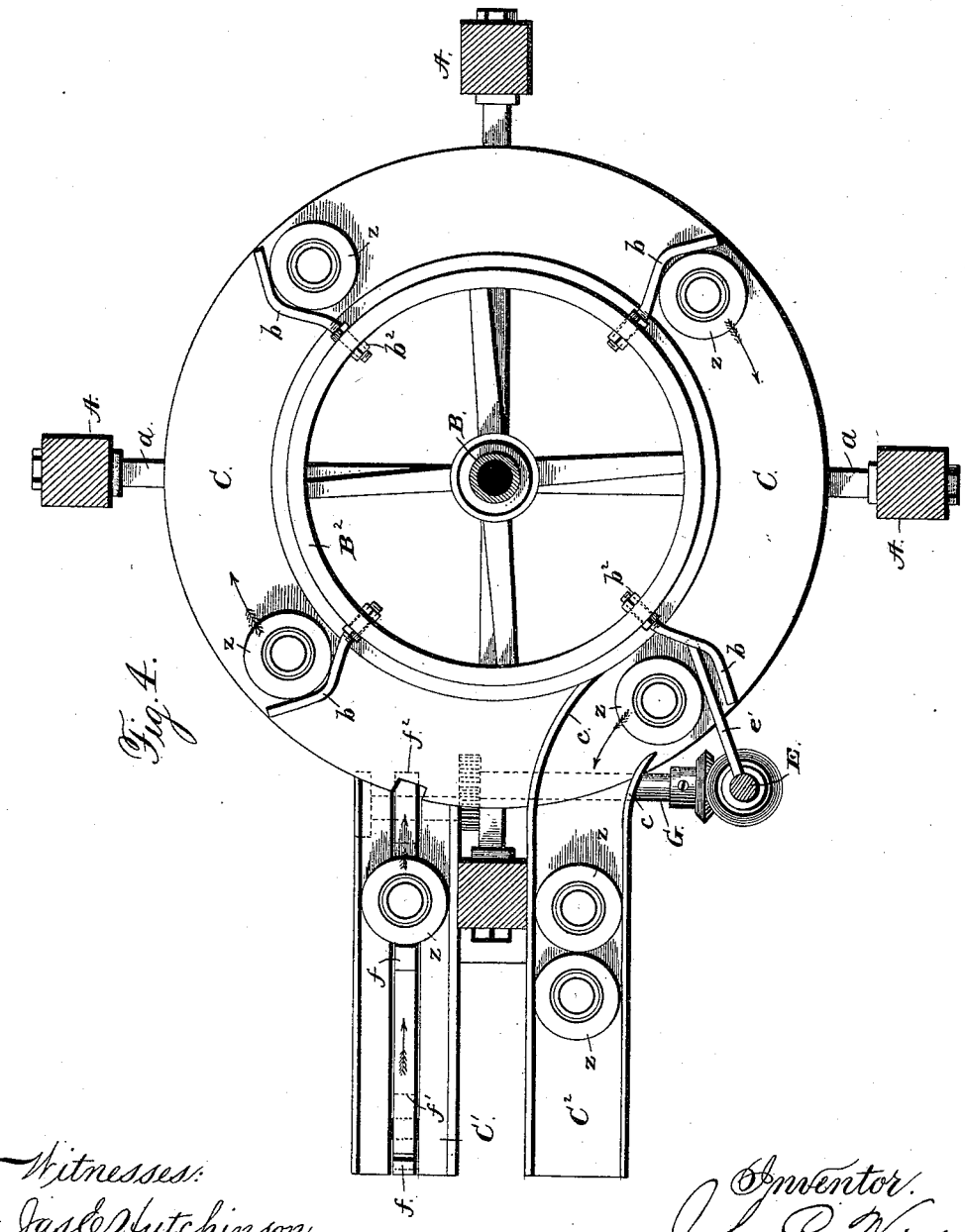
Figure 5:
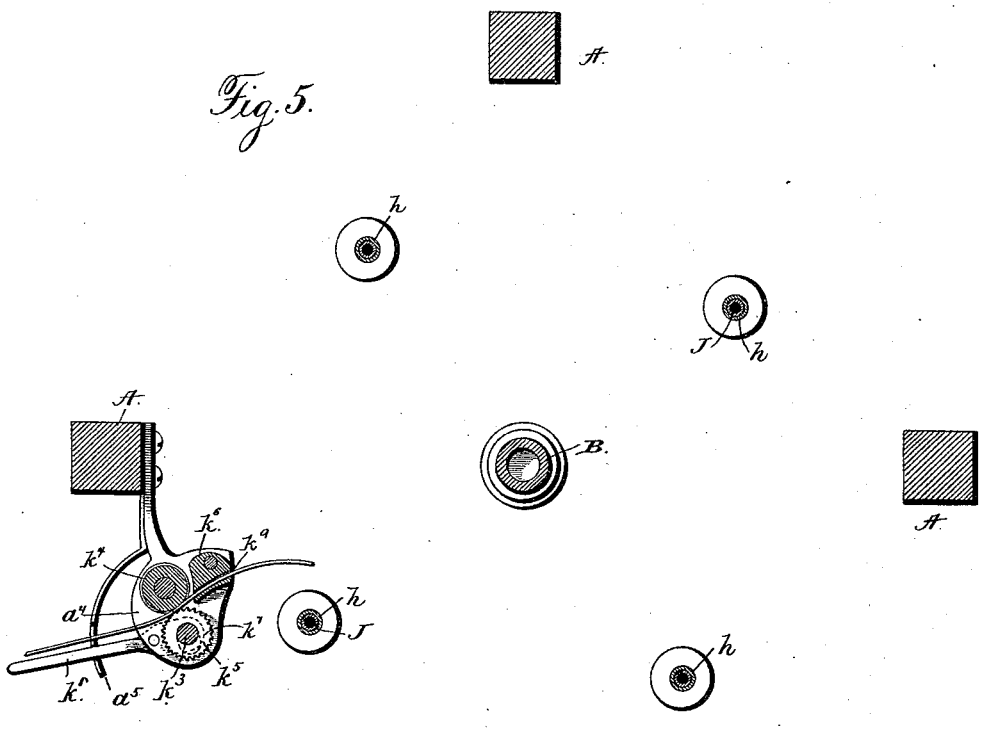
Figure 6:
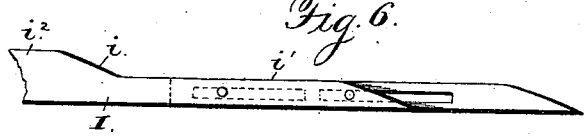

In the drawings, Figure 1 is a plan view of my improved machine. Fig. 2 is an elevation of the same. Fig. 3 is a central vertical section of the same. Fig. 4 is a horizontal section on line $x\ x$ of Fig. 3, looking down. Fig. 5 is a horizontal section through the solder-feeding wheels, the soldering-iron shafts, the central shaft, and the posts of the frame; and Fig. 6 is a detail view of the adjustable or extensible cam-track.

The frame of the machine consists of posts or uprights A, connected by upper and lower cross-rods $a$ and hollow hubs $a'$, the latter forming bearings for a central hollow vertical shaft B.

C is an annular or circular table attached to the lower cross-rods $a$, and on which the filled cans travel while being soldered.

C' is a can-supplying chute or guideway, and C² a discharge chute or guideway, these chutes or guideways being on a level with the said table, and are or may be sustained by the latter and one of the posts A.

Supported in suitable bearings attached to the posts A is a driving-shaft D, having a pulley $d$, which is preferably loose thereon and connected therewith through a splined clutch-collar $d'$, movable lengthwise of the shaft by a hand-lever $d^2$ to connect or disconnect the power. The driving-shaft is geared to the vertical shaft E, journaled in brackets $a^2\ a^3$ and provided with a gear-wheel $e$, meshing with a larger gear-wheel B' on the shaft B, and to the latter, near the table C, is secured the can-conveying wheel B², having bent arms $b$, extending over the said table and serving to carry the cans around on the same.

The conveying-wheel B² is preferably attached to the shaft B by a set-screw $b'$ at its hub, so that it may be adjusted vertically to vary the distance of the arms from the table for different sized cans, and the said arms are also preferably rendered adjustable radially of the said wheel by being provided with threaded portions passing loosely through the rim of the wheel, and on which threaded portions on opposite sides of said rim are adjusting set-nuts $b^2$, which may be turned to move the arms in and out radially, as will be obvious. (See Fig. 4.)

The discharge chute or guideway C² has curved edge flanges $c$, extending over the table C, and the vertical shaft E is provided with an arm or discharger $e'$, which sweeps over the table and takes the cans from the conveying-arms $b$ and pushes them into the said chute, where they force each other along until removed by the attendant, the said chute being in practice long enough to hold quite a number of cans. The shaft E is so geared relatively to the shaft B that the arm $e'$ will sweep over the table every time a conveying-arm $b$ is about to pass.

The can-supplying chute C' is provided at its center with an endless conveyer F, herein shown as an endless belt having projecting pieces or blocks $f$, extending above the surface of said chute to engage cans setting therein and carry them onto the table C, within the range of the conveying-arms $b'$. This endless belt passes over pulleys $f'$ and $f^2$, the latter being attached to a horizontal shaft $f^3$, herein shown as being geared to the shaft E through a shaft G; but the said pulley $f^2$ may be on the latter shaft, if desired, and might in practice be made as a sprocket-wheel to operate the endless conveyer positively.

The wheel B' is provided with a series of sleeves H, through which loosely pass the vertical shafts $h$, to the lower ends of which the circular soldering-irons H' are attached, said shafts being provided at their upper ends with pinions $h'$, meshing with a stationary gear L, through which the shaft B loosely passes. The said gear L is supported from the posts A by suitable arms L', Fig. 2, and serves to revolve the said shafts $h$ and the soldering-irons carried thereby as the wheel B' rotates and carries the said shafts and soldering-irons bodily around over the table C.

The shafts $h$ have at proper intervals vertical movements to lift the soldering-irons from or lower them upon the cans $z$. As herein shown, these shafts $h$ are lifted by means of levers $h^2$, having bosses through which said shafts loosely pass, and which are beneath the hubs of the pinions $h'$, said levers projecting beyond the wheel B, so that their outer ends will engage a stationary cam or track I, supported by the posts A, and having, besides the inclines at its ends, up and down which the ends of said levers ride to raise and lower the shafts $h$, an intermediate incline $i$, which affords two bearing portions or edges $i'$ and $i^2$ at two different heights.

Passing loosely through the shafts $h$ (which for this purpose are made hollow) are the cap-holders J, consisting, preferably, of small tubes split and spread slightly at their lower ends and having pins or collars $j$ near their upper ends resting on the pinions $h'$ to support the said holders, the latter normally projecting below the soldering-irons when the said irons are lifted from the cans. If more pressure by the holders J than their weight will afford is desired, small annular weights may be placed thereon above the pins or collars $j$. Instead of tubes, these holders may be solid bars or rods. When a can, with its cap in position to be soldered, comes beneath the soldering-iron and the latter is being lowered onto the can, the cap-holder J first comes in contact with the cap, so as to steady it in position and prevent its displacement by the rotating iron when the latter first touches it as well as during the process of soldering, and owing to the two bearing-edges $i'$ and $i^2$ of the cam-track I, afforded by the incline $i$, the cap-holder will still rest on the cap for a little time after the soldering-iron has been lifted by the edge $i'$ before the edge $i^2$ finally lifts a shaft $h$ high enough to raise the cap-holder from the can. Thus the solder will be allowed to cool around the cap after the soldering-iron has been lifted before the cap-holder is raised, and more or less time for cooling can be provided for by making the cam-track extensible, as shown in Fig. 6. The gear L is wide enough so that the pinions $h'$ are always in mesh therewith, notwithstanding their vertical movements.

Journaled in brackets $a^4$, attached to one of the posts A, is a vertical shaft K, having a gear-wheel $k$, meshing with the large gear-wheel B', said shaft having a pinion $k'$, meshing with a second pinion $k^2$ on a second shaft $k^3$. These shafts are provided at their lower ends with solder-feeding wheels $k^4$ and $k^5$, the former being preferably grooved and the latter roughened or provided with teeth, and adjacent to these feeding-wheels is a guide $k^6$, having a curved groove $k^9$. The solder, in the form of a wire, is passed between these feeding-wheels and is bent by the curved guide to conform more or less closely to the periphery of the soldering-irons, so that when touched by an iron the projecting curved end of the wire-solder will be quickly melted and will flow down the soldering-iron onto the can and be spread around the cap. The lower end of the shaft $k^3$ preferably has its bearing in a movable block or plate $k^7$, pivoted to the lower bracket $a^4$ and provided with a hand-lever $k^8$, engaging a stop-arm $a^5$, attached to said bracket, so that the feeding-wheel $k^5$ may be moved toward and from the wheel $k^4$ to accommodate different sizes of wire or the said wheels be spread far enough apart to suspend the feed of the wire altogether when necessary.

The soldering-irons H' are heated by burners, using either oil or gas, and supplied with a blast of air to secure the proper heat, the air and the oil or gas being conveyed to the said burners through the hollow shaft B, having a partition $b^4$ to form separate oil or gas and air chambers. Suitable stuffing-boxes or glands of well-known construction are provided in the hollow hubs $a'$ at the ends of said shaft to form tight joints, and the oil or gas is conveyed to said hubs by pipes O, denoted by dotted lines in Fig. 3.

M denotes a gas-burner, and N an oil-burner, either form of burner being supplied with combustible material and air through pipes $m$, communicating with the interior of the hollow shaft B, the said shaft being preferably enlarged at the point where the pipes $m$ enter it, so that the pipe-holes will not weaken it too much.

The gas-burner M is provided with a combustion-chamber $m'$, into which the air and gas pipes converge, and the oil-burner N has a similar chamber $n'$, adjacent to the points $n$ on the pipes $m$, the latter being threaded a sufficient distance from their ends to permit their points to be adjusted to get them in proper position relative to each other to obtain the best results in combustion. The pipes $m$ are provided with suitable valves $m^2$ to regulate the supplies of combustible material and air.

The soldering-irons are preferably surrounded by hoods P, as shown at the left of Fig. 3, to confine the heat and cause the hot blasts to circulate around the irons better, said hoods being suspended from the sleeves H.

Over the can-supplying chute C' is a flux or acid applying brush R, carried by a vertically-movable bar $r$, attached to the arm $r'$ of a small rock-shaft $r^2$, having an inner arm $r^3$, arranged in the path of movement of the outer ends of the soldering-iron-lifting levers $h^2$ when the latter are passing over the cam-track I, so that when a lever $h^2$ strikes the arm $r^3$ the shaft $r^2$ will be rocked and the brush R be depressed onto a can passing beneath it to spread the flux or acid thereon. The flux is contained in a suitable vessel S, suspended over the brush R, so that flux may be permitted to drip on the latter, and thus keep it moistened. When a lever $h^2$ passes beyond the arm $r^3$, a spring $r^4$, attached to the rearwardly-extending end of the arm $r'$, will lift the brush to its normal position. The brush R is preferably inclined, as shown, so that the flux can drip onto it, and also so that the cans will pass it easily and be properly moistened by the flux.

In the operation of my machine the attendant merely has to place the cans, with the caps in position, in the chute $C'$ and remove them from the chute $C^2$. The cans set into the chute $C'$ are carried forward by the endless conveyer F within the range of the arms $b$ of the conveying-wheel $B^2$, and are carried around on the table C by said arms. Shortly after a can has passed onto the said table C the heated rotating soldering-iron descends upon it, and as the said iron passes the solder-feeding wheels $k^4 k^5$ it is supplied with solder, as hereinbefore described, and the rotation of the iron in contact with the can-cap during the travel of the can nearly around the table C effectively spreads the solder, so that when the iron is lifted from the can by the cam-track I, prior to the time the can is to be swept into the discharge-chute $C^2$, the cap has been perfectly soldered and the operation is completed.

Owing to the fact that the soldering-irons move up and down in front of the burners, the lower parts of the former will be heated when they are raised, and the upper parts thereof will be heated when they are lowered.

Having thus described my invention, I claim and desire to secure by Letters Patent—

1. In a can-capping machine, the combination, with a table to support the cans, of a conveying device for moving the cans on said table, and a series of horizontally-traveling and rotating soldering-irons.

2. In a can-capping machine, the combination, with a table to support the cans, of a conveying device for moving the cans on said table, a series of horizontally-traveling and rotating soldering-irons, and means for imparting vertical movements to the latter to cause them to be lowered upon or lifted from the cans.

3. In a can-capping machine, the combination, with a stationary can-supporting table and a conveying device for moving the cans upon the same, of a can-supplying chute having a carrier to supply the cans to the said conveying device, a can-discharging chute, and a discharger to remove the cans from said table into said discharging-chute.

4. In a can-capping machine, the combination, with a stationary can-supporting table, a series of rotating and horizontally-traveling soldering-irons moving above the same, and a conveying device for moving the cans upon the said table, of a can-supplying chute having a carrier to supply the cans to the said conveying device, a can-discharging chute, and a discharger to remove the cans from the table into said discharging-chute.

5. In a can-capping machine, the combination, with a circular or annular can-supporting table, of a conveyer-wheel having a series of conveying-arms extending above said table, and a series of rotating and horizontally-traveling soldering-irons moving in a circular path above said table.

6. In a can-capping machine, the combination, with a circular or annular can-supporting table, of a conveyer-wheel having a series of conveying-arms extending above said table, a series of rotating and horizontally-traveling soldering-irons moving in a circular path above said table, and burners to heat said irons while they are in operation.

7. In a can-capping machine, the combination, with horizontally-traveling and rotating soldering-irons, and burners for heating the same when in operation, of traveling hoods surrounding said irons to confine the heat and cause the blast to circulate around the said irons.

8. In a can-capping machine, the combination, with the rotating and horizontally-traveling soldering-irons and their vertically-movable tubular shafts, of the cap-holders within said shafts and soldering-irons.

9. In a can-capping machine, the combination, with a can-supplying conveyer, a can-supporting table, and rotating soldering-irons traveling above the latter, of an automatic flux-supplying device to apply the flux to the cans as they are fed to the soldering-irons.

10. In a can-capping machine, the combination, with a stationary table, and a series of rotating and horizontally-traveling soldering-irons moving above said table, of a solder-feeding device stationary relative to the said irons and serving to feed the solder into the path thereof.

11. In a can-capping machine, the combination, with a can-supplying conveyer, a can-supporting table, a conveyer for transporting the cans along over the latter, and rotating soldering-irons traveling above said table, of an automatic flux-supplying device to apply flux to the cans as they are fed to the soldering-irons, and a solder-feeder to supply said irons with solder.

12. In a can-capping machine, the combination, with a stationary circular can-supporting table and a hollow shaft central of the latter, of a wheel on said shaft, a series of rotating and horizontally-traveling soldering-irons carried by the said wheel, and burners carried by said shaft for heating said irons.

13. In a can-capping machine, the combination, with a stationary circular can-supporting table and a hollow shaft central of the latter, of a wheel on said shaft, a series of rotating and horizontally-traveling soldering-irons carried by said wheel, burners carried by said shaft for heating said irons, and a conveyer-wheel attached to said shaft and having a series of conveyer-arms extending over said table.

14. In a can-capping machine, the combination, with a circular can-supporting table, of a shaft at the center of said table, a conveyer-wheel carried by said shaft and having a series of conveyer-arms extending over said table, a soldering-iron-supporting wheel also carried by said shaft, a series of vertical shafts carried by said wheel and provided at their lower ends with soldering-irons, pinions attached to said vertical shafts, and a stationary gear-wheel with which said pinions mesh to rotate said soldering-irons.

15. The combination, with the circular can-supporting table C, of the shaft B, carrying the wheel B', provided with the depending sleeves H, the soldering-iron shafts $h$ in said sleeves, and provided with the pinions $h'$, the stationary gear-wheel L, with which said pinions mesh, and the conveyer-wheel $B^2$, also carried by said shaft and provided with the arms $b$, extending over said table.

16. The combination, with the table C and the shaft B, of the conveyer-wheel $B^2$, having the conveyer-arms $b$ and adjustable vertically on said shaft to vary the distance between said arms and table.

17. The combination, with the conveyer-wheel B, of the bent arms $b$, threaded at their inner ends and passing through the rim of said wheel, and the nuts on said threaded ends of said arms on opposite sides of said rim for securing the said arms in different radial positions.

18. The combination, with the shaft B and the wheel B', carried thereby and having the sleeves H, of the vertically-movable soldering-iron shafts journaled in said sleeves, the stationary cam I, and devices extending over said cam and serving to lift said shafts and the soldering-irons carried thereby.

19. The combination, with the vertically-movable hollow soldering-iron shafts, of the cap-holders within said shafts, the stationary cam having two edge parts at different heights and an incline connecting the same, and devices extending over said cam and serving to lift the said shafts and the soldering-irons carried thereby and also the said cap-holders.

20. The combination, with the stationary circular can-supporting table C, of the shaft B, the rotary conveyer-wheel $B^2$, attached to said shaft and having arms extending over said table, the shaft E, geared to the said shaft B and provided with the can-discharging arm $e'$, sweeping over said table, and the discharging-chute $C^2$, into which the cans are forced by said arm.

21. The combination, with the circular can-supporting table C, of the shaft B, the conveyer-wheel $B^2$, carried by said shaft and extending over said table, the shaft E, geared to said shaft B, and the can-supplying chute C', provided with an endless belt-conveyer operated from the said shaft E.

22. The combination, with the stationary circular can-supporting table C, of the shaft B, the rotary conveyer-wheel $B^2$, carried by said shaft and extending over said table, the shaft E, geared to said shaft B and having the discharge-arm $e'$, and the discharge-chute $C^2$, into which the cans are swept by said arm.

23. In a can-capping machine, the combination, with the flux-applying brush R, of the rock-shaft $r^2$, having arms $r'$ and $r^3$, to the former of which said brush is connected, and the levers $h^3$, engaging the said arm $r^3$ at intervals to lower the brush onto the cans.

24. In a can-capping machine, the combination, with the horizontally-traveling and rotating soldering-irons and their operating mechanism, of a solder-feeding device consisting of two feeding-wheels adjacent to the path of said irons, and between which the solder-wire passes.

25. In a can-capping machine, the combination, with the horizontally-traveling and rotating soldering-irons and their operating mechanism, of a solder-feeding device consisting of two feeding-wheels adjacent to the path of said irons and between which the solder-wire is passed, and a curved guide to bend the said solder-wire as it is fed to the said soldering-irons.

26. The combination, with the traveling and rotating soldering-irons and the solder-feeding shafts K and $k^3$, carrying the feeding-wheels $k^4$ and $k^5$, of the movable block or plate $k^7$, in which one end of said shaft $k^3$ is journaled, and a handle or lever for adjusting said block or plate.

27. The combination, with the hollow shaft B, having a partition $b^4$, of the soldering-irons carried by said shaft, burners to heat said soldering-irons, and pipes communicating with the compartments above and below said partition and carrying air and combustible material to said burners.

28. The combination, with the stationary can-supporting table, hollow shaft B, having the wheel B', and the rotary and horizontally-traveling soldering-irons carried by said wheel, of the burners moving with the said soldering-irons and having combustion-chambers adjacent thereto.

29. The combination, with the vertically-movable and rotating soldering-iron shafts and the soldering-irons carried thereby, of the cam-track I, having an adjustable or extensible portion to vary the time at which said irons are to be lifted from the cans.

30. In a can-capping machine, the combination, with a support for the cans, of a carrier to engage and move the cans along said support, a series of traveling soldering-irons arranged above the can-carrier and traveling conjointly therewith and with the cans, which are moved horizontally thereby, and burners for heating said irons while they are in motion.

31. In a can-capping machine, the combination, with a series of traveling soldering-irons, of a traveling can-carrier below the same and moving conjointly or in unison therewith, and traveling burners for heating said irons while they are in motion.

In testimony whereof I affix my signature in presence of two witnesses.

JOHN C. WINTERS.

Witnesses:
 JOHN M. PROPHET,
 JAMES A. ELDRETT.